United States Patent
Pineau et al.

(10) Patent No.: US 6,281,502 B1
(45) Date of Patent: Aug. 28, 2001

(54) REMOTE αSOURCE LOCATION DEVICE AND METHOD

(75) Inventors: Jean-François Pineau, Sylvestre; Gérald Imbard, Avignon, both of (FR)

(73) Assignees: Commissariat a l'Energie atomique, Paris; Algade, Bessines sur Gartempe, both of (FR)

( * ) Notice: Subject to any disclaimer, the term of this patent is extended or adjusted under 35 U.S.C. 154(b) by 0 days.

(21) Appl. No.: 09/155,495

(22) PCT Filed: Mar. 28, 1997

(86) PCT No.: PCT/FR97/00569

§ 371 Date: Sep. 28, 1998

§ 102(e) Date: Sep. 28, 1998

(87) PCT Pub. No.: WO97/37244

PCT Pub. Date: Oct. 9, 1997

(30) Foreign Application Priority Data

Mar. 29, 1996 (FR) .................................. 96 03976

(51) Int. Cl.[7] .................................................. G01T 1/205
(52) U.S. Cl. ........................................ 250/361 R; 250/362
(58) Field of Search ............................. 250/361 R, 370.02, 250/362, 368, 390.11

(56) References Cited

U.S. PATENT DOCUMENTS

| | | | |
|---|---|---|---|
| 4,983,834 | * | 1/1991 | Lindmayer et al. ............... 250/327.2 |
| 5,088,492 | * | 2/1992 | Takayama et al. .................. 128/654 |
| 5,286,973 | * | 2/1994 | Westrom et al. ..................... 250/253 |
| 5,587,112 | * | 12/1996 | Kauffman et al. ................... 252/589 |
| 5,668,593 | * | 9/1997 | Lareau et al. ........................ 348/146 |
| 5,774,515 | * | 6/1998 | Fujiwara et al. ..................... 376/254 |
| 5,783,828 | * | 7/1998 | Pacenti et al. ....................... 250/364 |

FOREIGN PATENT DOCUMENTS

| | | |
|---|---|---|
| 3637276 A1 | 10/1987 | (DE) . |
| 0 425 333 A1 | 5/1991 | (EP) . |
| 0 542 561 A1 | 5/1993 | (EP) . |

OTHER PUBLICATIONS

J.E. Koster et al., "Alpha Detection as a Probe for Counter Proliferation", Dec. 10, 1994, Proceedings of the Annual International Carnahan Conference on Security Technology, Albuquerque (New Mexico) pp. 6–19 (Oct. 12–14, 1994).
Koster J E et al: "Alpha Detection as a Probe For Counter Proliferation" Oct. 12, 1994.

\* cited by examiner

*Primary Examiner*—Constantine Hannaher
(74) *Attorney, Agent, or Firm*—Pearne & Gordon LLP

(57) ABSTRACT

A device and a method of remotely locating α particle sources. In the method of remotely locating sources of α particles in an environment, a scintillating gas is used that may contain nitrogen and fills the environment (10, 30), the scintillating gas is used to convert the α particles emitted by the sources (14) into ultraviolet radiation, and an image of the ultraviolet radiation is formed on a photosensitive surface (20). This image can be displayed on film or on a video screen and may be superimposed on the visible image of the observed field. The device and method may be applicable to radioprotection and to the detection of the presence of radioactive materials and sources of radiation leaks.

26 Claims, 1 Drawing Sheet

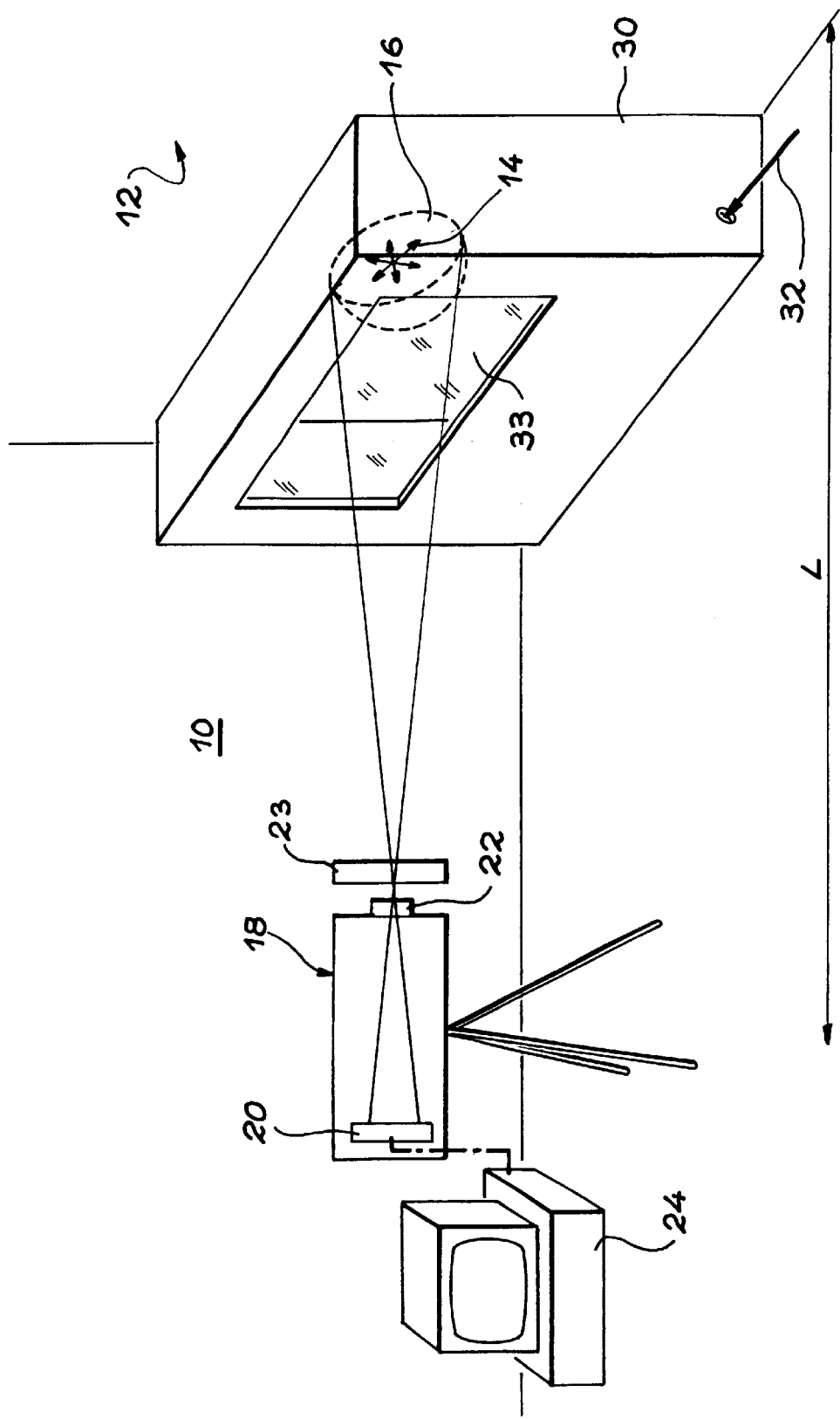

REMOTE αSOURCE LOCATION DEVICE AND METHOD

DESCRIPTION

1. Technological Field

This invention relates to a device and a method of remotely locating and of displaying sources of α particles, that is to say, particles the energy of which is generally less than 10 MeV.

The invention can be used notably in the field of radio-protection in order to locate radioactive sources on a surface or within a volume.

The device, object of the invention, may be applied in numerous other fields such as the decommissioning of nuclear installations, dismantling and maintenance operations, a radioactive inventory, post accident operations, or as an aid to operators with regard to following a process under operation.

The invention also finds applications in the detection of leaks of radioactive gases and the detection of the presence of a radioactive gas (in particular radon) or radioactive contamination in the form of an aerosol.

In a general way, the invention essentially relates to the detection and location of strongly ionising particulate radiation (with high linear energy transfer).

2. State of the prior art

α radiation is the natural radioactivity most frequently occurring during the disintegration of nuclei whose atomic mass is greater than 200. This takes place through the emission of α particles which are doubly ionised helium atoms.

Particle detectors generally supply information resulting from the interaction of the particles which pass through them with the sensitive part of the latter.

When an α particle passes through a medium, it suffers an energy loss essentially due to the ionisation and the excitation of the medium passed through. The phenomena of diffusion and of Bremstrahlung radiation appear to be negligible.

Ionisation can be understood as the removal of one or more electrons from an initially neutral atom. The electron removed can remain free or may attach itself to another atom and form a negative ion.

Two major phenomena come into play during the creation of these pairs of positive and negative ions: about ⅓ of the ionisations are produced by primary ionisation, that is to say by direct interaction with the α particles, the remaining ⅔ being created by secondary ionisation, produced by fast electrons emitted during the primary ionisation. These fast electrons bear the name "δ rays".

As previously indicated, the passage of an α particle in the medium can also be expressed by simple excitation of the medium.

An atom is considered to be excited when it passes from a stable energy state to a state of higher energy. The excitation energy is nevertheless insufficient to eject an electron. In general, the energy used up by excitation is subsequently dissipated either in a non-radiative fashion, that is to say in the form of thermal energy of vibration or of translation, or in radiative fashion, that is to say by the emission of photons.

A medium in which a non-negligible fraction of the absorbed energy is released in radiative fashion through the emission of photons is called a scintillator.

Hence known α particle detectors in general, comprise a solid or liquid scintillating medium that allows the "conversion" of the α radiation into photons and a photomultiplier system or a sensitive surface for detecting the photons emitted by the scintillator.

These detectors are not however capable of remotely locating a source of α radiation. In effect, the free path of the α particles in the air is very small and it is necessary to bring the detector to the direct vicinity of the source in order to carry out the measurements.

The scintillators are not necessarily solids or liquids. They may also be in gaseous form.

The scintillation of gases excited by nuclear particles has been known since the beginning of research into radioactivity, but it was only in 1951, thanks to the use of photomultipliers that the study of the mechanism of the emission linked to the passage of a particle within a gas was able to be undertaken by Grün and Schopper. A year later, C. Muehlhause used a gas as a scintillator in nuclear physics.

Numerous studies have been made of the scintillation of the noble gases. In effect, in any gas, the atoms can interact with one another and in so doing transfer a part of their excitation energy. If an atom is in a complex molecule, the energy transfer can take place in the form of thermal energy of vibration or rotation, thereby not creating any light emission. The noble gases on the other hand, due to their highly stable electronic structure, can only transfer the energy of one excited atom to another, at the time of collision.

Studies have shown that air also has scintillation properties and that the spectrum of air, excited by sources of α radiation, is made up of a series of bands identical to those observed in the emission spectrum of nitrogen.

Argon present in air has excellent emission properties but the very low proportion present means that its contribution to the luminescence of air is negligible.

The oxygen in the air does not emit fluorescence but on the contrary acts as a quenching substance. In effect, even a small quantity of oxygen mixed with a gas can obstruct its scintillation properties. By way of example, the presence of 2% oxygen in a mixture of oxygen and xenon causes a reduction of the order of 70% in the scintillation amplitude of the xenon.

Air, because of this quenching phenomenon has a very low scintillation yield. The scintillation yield is only a few photons per α particle.

In pure nitrogen, the number of photons emitted is considerably greater than the number of photons emitted in air. However the scintillation phenomenon remains relatively weak.

Table I below shows that the pressure of the gas is also an important parameter for the scintillation effect of gases and, in particular, nitrogen.

Table I gives an example of the number of photons emitted by an α particle as a function of the pressure of the scintillator gas (nitrogen) for a source of particulate radiation.

TABLE I

| Pressure (hpa) | No. of photons emitted by an α |
|---|---|
| 331 | 1970 |
| 350 | 1310 |
| 833 | 1060 |

It is apparent that the total number of photons reduces with an increase in the pressure. This is due to the fact that at high pressure, the number of collisions between atoms and molecules of the gas increases. The increasing number of collisions causes a greater loss of non-radiative energy.

Because of the poor scintillation properties of nitrogen and in particular of air, and the high cost of noble gases, the only use of gases as scintillators is confined to experimental counting devices.

Documents 1 and 2, references to which are given at the end of this description give examples of detection installations that use a gas such as, for example, nitrogen, as a scintillator. In these installations, the source and the scintillator are positioned in proximity to a detector such as a photographic chamber or a photomultiplier, so as to carrying out counts or spectroscopic studies of the luminescence of the gas scintillator.

Document 3, the reference to which is also given at the end of the description, states that neither nitrogen nor air is of practical interest as a scintillator. The presence of nitrogen in a scintillation counter using a noble gas is even considered to be undesirable.

STATEMENT OF THE INVENTION

The invention stems from the surprising fact discovered by the inventors that despite the very poor scintillation properties of nitrogen and above all a nitrogen-oxygen mixture such as air, it is not impossible to use these gases as a scintillator for the remote location of radioactive sources emitting heavy charged particles.

By remote location one understands that this occurs at a distance from the source that can be very substantially greater than the path of the α particles in the gas or in air (which is a few centimetres).

In effect the invention relates to a method of remotely locating sources of α particles in an environment in which one uses a gas containing nitrogen to fill the surrounding space, in order to convert α particles emitted by the sources into photon radiation the wavelength of which is, for example, in the ultraviolet band; and in which an image of said radiation is formed on a photo-sensitive surface.

Although the invention is not limited to the case where the photon radiation has a wavelength in the ultraviolet band, this radiation will be designated UV radiation in the description that follows for reasons of simplification.

The location of sources of α particles is differentiated from the simple detection of α particles notably in that the sources are not necessarily positioned under a detector or proximate to it, but dispersed within the environment. The location consists for example, of determining and displaying in the environment the site and the form of one or more contaminated zones.

This is made possible thanks to the image from the UV radiation. The distance limitation on detection is only the absorption of the UV by the atmosphere, detection distances ranging up to several hundreds of meters, even several kilometers being imaginable.

In a very advantageous way, notably for cost reasons, air can be used as the scintillating gas in a particular application.

According to one aspect of the invention, it is possible to demarcate the environment with an enclosure substantially impermeable to the gas and with a wall at least locally transparent to UV radiation. The enclosure is filled with a gas containing nitrogen and on the sensitive surface an image is formed from the induced photon radiation, through the transparent wall.

The environment in the sense of the invention, is limited in this case to the internal volume of the enclosure. This volume is, for this type of application smaller than the total volume of the room in which one is operating.

One may, effectively consider increasing or reducing the pressure within the enclosure in order, for example, to limit leakage of the gas filling it or to avoid its contamination.

Hence it is possible to more easily control the gas filling the environment and to act upon its composition, or possibly its pressure.

When a sensitive surface is used, the sensitivity spectrum of which extends beyond the ultraviolet emission spectrum of the nitrogen excited by the α particles, it may be advantageous to form the image from the ultraviolet radiation in the absence of visible light. This measure allows one to improve the signal to noise ratio of the image.

Another measure that allows one to improve the image consists of forming it through a filter that selectively allows the ultraviolet radiation to pass, in particular for wavelengths corresponding to the scintillation of nitrogen.

It can also be advantageous, so as to facilitate the exploitation of the remote locating system, to form the image of the photon radiation (ultraviolet) in the presence of artificial visible light. This artificial visible light, can because of its oscillatory nature linked to the frequency of the supply of electric current, be numerically subtracted from the total image made up of the UV image and the visible image.

To facilitate the labelling of the sources on the ultraviolet radiation image, it is possible to superimpose a position finding grid on the image.

A particularly interesting solution consists of forming, as well as the image from the ultraviolet radiation, an image from visible light from the environment. These two images can then be superimposed in order to find more easily the position of the sources in relation to objects positioned in the environment.

In this case, it is possible to create the visible light image under artificial illumination of the environment.

The artificial illumination, the emission of which is sensitive to the frequency of the current supply can, in effect, and if necessary, be digitally subtracted from the ultraviolet radiation image when the sensitive element is an electronic sensor.

The invention also relates to a device for remotely locating sources of α particles. The device includes a surface sensitive to ultraviolet radiation, a gaseous scintillator medium that includes nitrogen and which fills the environment, and optical means of forming an image from the ultraviolet radiation from the environment on the sensitive surface. The ultraviolet radiation comes from the scintillation of the gaseous medium which is excited by the α particles emitted by the source or sources.

The device can include a camera which is fitted with a sensitive surface. This is formed, for example, by a matrix of photo-diodes sensitive to ultraviolet radiation and possibly to visible light.

Other characteristics and advantages of the invention will emerge from the description that will follow making reference to the appended drawing which is given for purely illustrative purposes and which is non-limitative.

BRIEF DESCRIPTION OF THE FIGURE

The single FIGURE represents, in diagrammatic fashion, the elements of the device of the invention for locating α radiation sources in an environment.

DETAILED DESCRIPTION OF EMBODIMENTS OF THE INVENTION

The single Figure shows a room, one of the walls 12 of which has one or more sources 14 of α radiation. This is, for example, radioactive contamination. The α particles emitted by the source are rapidly stopped by the air in the room 10. A dome surrounding the source indicates diagrammatically the maximum mean range of the α particles and demarcates a zone called "the scintillation effect zone" 16.

Within this zone 16, the α particles interact with the atoms of nitrogen to cause a scintillation. The scintillation expresses itself by the emission of ultraviolet photons which are propagated freely within the room. In effect, the ultraviolet photons show virtually no interaction with the gas filling the room 10. A camera or photographic chamber 18, viewed in section, comprises a surface 20 sensitive to the ultraviolet radiation and an optical system 22 to form an image from the ultraviolet radiation on the sensitive surface 20.

In practice, the optical system 22 is provided to form an image of the wall 12 and of the zone 16 on the sensitive surface 20 for the radiation the wavelength of which is generally between 200 and 400 nm. Any optical system or catadioptric system, such as, for example, an objective of the UV NIKKOR type can be suitable.

The sensitive surface 22 can be a photographic film or, preferably, a matrix of electronic optical sensors, such as photo-diodes.

It may be, for example, a CCD type detector (with charge transfer) of 512×512 pixels with a 12.3×12.3 cm matrix, each pixel of which has a size 24 μm×24 μm.

The detector is connected to an acquisition and management system 24 for the detector of a known type.

This may be, for example, an ST 138 type controller.

The 50 Hz frequency appears to be sufficient to carry out measurements. In effect, as the phenomenon of nitrogen scintillation creates few photons, it is not generally necessary to read the detector at a greater frequency. However in order to digitally subtract the influence of the artificial light, if this is needed, it can be useful to work at higher frequencies while adding the images obtained.

While the low quantity of nuclear events is prejudicial to the detection by the device, it is possible to benefit from the statistical nature of the appearance of events to reconstitute "the radiative image" of the scene. The acquisition integrates the signal by summing a large number of crude or corrected images.

The acquisition system 24 also includes means of displaying the image formed on the detector, such as a monitor or a video screen, for example. The display of the images can then take place in real time.

The sensitivity spectrum of the surface 24 corresponds for example to a range of wavelengths extending from 200 nm to 400 nm. However one may also use a surface sensitive over a wider spectrum and link an interfering filter 23 to the optical system 22, that only allows UV radiation within a range of chosen wavelengths to pass.

In one particular implementation, it is also advantageously possible to use a more extended spectrum for the sensitive surface in order to form, in addition, an image of the room 10 from visible light. This visible image can also be displayed on the video screen.

This visible light image, when it is superimposed on the UV radiation image, allows the position of sources of α radiation to be more easily identified, notably in relation to the walls of the room or other objects which are arranged in it.

Thanks to the system for acquisition and management of detector, it is possible to digitally add or subtract data corresponding to the visible light image and the ultraviolet radiation image. It is also possible to subtract a separately recorded "base noise" from the image.

The acquisition and management system also allows one to digitally modify the sensitivity and the resolution of the images, or to enlarge all or a part of the image.

The oxygen present in the air has a negative effect on the scintillation phenomenon of the nitrogen contained in the air. As the Figure shows, in order to limit this effect, it is possible to demarcate a smaller environment within the room, in which it is possible to control more easily the composition of the gas surrounding the source.

Hence, an enclosure 30, substantially impermeable to gas, is arranged in the room 10 in a place where the existence of a source of α particles that one wishes to locate, is presumed to be. In the case of the Figure, the enclosure 30 is back to back with the wall 12 and demarcates a space of volume less than the volume of the room 10. This space then constitutes the environment, in the context of the invention, within which the source must be located. This enclosure can advantageously be constituted by the glove box or by the shielded enclosure, with internal walls the contamination of which, one wishes to investigate.

The enclosure has dimensions which are greater than the maximum mean path of α particles in the gas, that is to say, greater than the dimensions of the scintillation effect zone 16.

A nitrogen generator 32 is connected to the enclosure 30 to increase the nitrogen content within the enclosure. Gases other than nitrogen such as certain noble gases like Ar, Ne, Kr and Xe or any mixture of these gases can also be blown into the enclosure 30 so as to improve the scintillation phenomenon.

It is also possible to remove at least a part of the oxygen contained in the enclosure 30 by causing combustion or a catalysed oxidation reaction.

The enclosure is made of a material transparent to UV radiation or includes a porthole 33 so as to allow passage of the scintillation photons to the camera.

Finally, it is apparent that, thanks to the device of the invention, and its method of operation, it is possible to locate a source of α radiation at a distance much greater than the mean free path of the a particles.

In effect, although the distance travelled by an α particle before interaction is of the order of a few centimetres, the distance L separating the source to be located from the measurement camera can be several kilometers. It is adjustable, notably by choosing the focal length of the optical system.

As indicated above, the device of the invention can find uses for the detection of radioactive sources. It may also be profitably used to detect in the environment a radioactive gas that emits α particles.

By way of example, to detect a leak in a tank such as a methane carrier tank, it is possible to inject into the double shell external to the tank, a gas containing sources of α particles, such as radon, and to form an image of the internal wall of the tank. This image makes the location of the leak apparent, since a scintillation occurs caused by the interaction of the α particles emitted by the radon and the ambient air.

DOCUMENTS QUOTED IN THE DESCRIPTION
(1) Gaseous Scintillation Counting by C. Eggler et al. Nucleonics, April 1956, pages 34 and 35.
(2) A Spectroscopic Study of Alpha-ray-Induced Luminescence in Gases by S. Dondes, Radiation Research 27, 1966, pages 174–209.
(3) The Theory and Practice of Scintillation Counting by J. B. Birks, Pergamon Press, page 578 and page 592.

What is claimed is:

1. A method of remotely locating sources of α particles in an environment comprising the steps of:
    providing a photosensitive surface;
    using a gas containing nitrogen within the environment to convert the α particles emitted by the sources (14) into photon radiation, wherein the environment is demarcated with an enclosure (30) substantially impermeable to gas and with a wall (32) at least locally transparent to the photon radiation, the enclosure being filled with gas containing nitrogen; and
    forming an image of the photon radiation on the photosensitive surface through said wall (32).

2. The method according to claim 1 where the photosensitive surface is located remotely to the source of the α particles.

3. A method according to claim 1 wherein the gas containing nitrogen is used to convert the α particles emitted by the sources (14) into ultraviolet photon radiation.

4. A method according to claim 1 wherein the image of the photon radiation is formed in the absence of visible light.

5. A method according to claim 1 wherein the image of the photon radiation is formed through a filter (23) that selectively allows the passage of ultraviolet radiation.

6. A method according to claim 1 wherein the image of the photon radiation is formed in the presence of artificial visible light.

7. A method according to claim 1 wherein a visible light image of the environment is additionally formed.

8. A method according to claim 7 wherein the visible light image is produced under artificial illumination of the environment.

9. A method according to claim 7 wherein the visible light image and the photon radiation image are superimposed.

10. A method according to claim 1 wherein air is used as a scintillator in order to convert the α particles emitted by the sources (14) into ultraviolet radiation.

11. A method of remotely locating sources of α particles in an environment comprising the steps of:
    providing a photosensitive surface;
    using a gas containing nitrogen within the environment to convert the α particles emitted by the sources (14) into photon radiation; and
    forming an image of the photon radiation on the photosensitive surface, said image forming through a filter (23) that selectively allows the passage of ultraviolet radiation.

12. A method according to claim 11 wherein the environment is demarcated with an enclosure (30) substantially impermeable to gas and with a wall (32) at least locally transparent to the photon radiation, the enclosure being filled with gas containing nitrogen and the image of the photon radiation is formed on the sensitive surface through said wall (32).

13. The method according to claim 11 where the photosensitive surface is located remotely to the source of the α particles.

14. A method according to claim 11 wherein the gas containing nitrogen is used to convert the α particles emitted by the sources (14) into ultraviolet photon radiation.

15. A method according to claim 11 wherein the image of the photon radiation is formed in the absence of visible light.

16. A method according to claim 11 wherein the image of the photon radiation is formed in the presence of artificial visible light.

17. A method according to claim 11 wherein a visible light image of the environment is additionally formed.

18. A method according to claim 17 wherein the visible light image is produced under artificial illumination of the environment.

19. A method according to claim 17 wherein the visible light image and the photon radiation image are superimposed.

20. A method according to claim 11 wherein air is used as a scintillator in order to convert the α particles emitted by the sources (14) into ultraviolet radiation.

21. A device for remotely locating sources of α particles in an environment, the device comprising:
    a surface (20) sensitive to ultraviolet radiation;
    a gaseous scintillator medium that includes nitrogen and which fills the environment;
    optical means (22) in order to form an ultraviolet radiation image of the environment on the sensitive surface; and
    an enclosure (30) substantially impermeable to the gas in order to define the environment, and provided with a wall, said wall at least locally transparent to ultraviolet radiation in order to form an image of the radiation on said surface (20), which is arranged outside of the enclosure.

22. A device according to claim 21, further comprising a camera, the camera being fitted with the sensitive surface.

23. A device according to claim 21, wherein the sensitive surface is a matrix of photodiodes.

24. A device according to claim 23, wherein the matrix comprises photo-diodes additionally sensitive to visible light.

25. A device according to claim 21, further comprising means to form a visible light image of the environment.

26. A device according to claim 25, further comprising a video screen in order to display at least one of the ultraviolet radiation and visible light images.

* * * * *